United States Patent
Heitkämper et al.

(10) Patent No.: US 6,784,219 B2
(45) Date of Patent: *Aug. 31, 2004

(54) POLYURETHANE CAST ELASTOMERS BASED ON DURENE DIISOCYANATE

(75) Inventors: Peter Heitkämper, Dormagen (DE); Klaus Jost, Dormagen (DE); Eduard Mayer, Dormagen (DE); Thomas Münzmay, Dormagen (DE); Joachim Wagner, Köln (DE); Christian Wolfrum, Köln (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/482,990

(22) Filed: Jan. 15, 2000

(65) Prior Publication Data

US 2003/0135008 A1 Jul. 17, 2003

(30) Foreign Application Priority Data

Jan. 30, 1999 (DE) .......................... 199 03 711

(51) Int. Cl.⁷ ............................................. C08G 18/10
(52) U.S. Cl. ....................... 521/159; 521/170
(58) Field of Search .................................. 521/159, 170

(56) References Cited

U.S. PATENT DOCUMENTS

| | | | |
|---|---|---|---|
| 3,001,971 A | * 9/1961 | Scott et al. | |
| 3,062,772 A | 11/1962 | Keplinger et al. | ............ 260/40 |
| 3,105,845 A | 10/1963 | Fetterly et al. | ............ 260/453 |
| 4,532,316 A | * 7/1985 | Henn | |
| 5,369,176 A | 11/1994 | DeKoning | .................. 525/126 |

FOREIGN PATENT DOCUMENTS

| | | |
|---|---|---|
| DE | 955094 | 12/1956 |
| DE | 19627907 | 1/1998 |
| DE | 19628145 | 1/1998 |
| DE | 19628146 | 1/1998 |

OTHER PUBLICATIONS

Saunders and Frisch; Polyurethane, Part II; pp. 307, 435–436, 447; 1964.*

* cited by examiner

Primary Examiner—Rachel Gorr
(74) Attorney, Agent, or Firm—Joseph C. Gil; John E. Mrozinski, Jr.

(57) ABSTRACT

The present invention relates to polyurethane cast elastomers which are prepared from higher molecular weight polyhydroxy compounds, durene diisocyanate and low molecular weight chain-lengthening and/or crosslinking agents. These elastomers are particularly useful for the production of moldings exposed to high mechanical stresses.

6 Claims, No Drawings

POLYURETHANE CAST ELASTOMERS BASED ON DURENE DIISOCYANATE

BACKGROUND OF THE INVENTION

The present invention relates to polyurethane cast elastomers based on 2,3,5,6-tetramethyl-1,4-diisocyanatobenzene (also known as "durene diisocyanate"), their preparation and their use for the production of moldings exposed to high mechanical stresses.

Polyurethane cast elastomers (PU elastomers) have been known for a long time and are described in numerous patent and literature publications.

An overview of PU elastomers, their properties and uses is given, for example, in Kunststoff-Handbuch, Volume 7, Polyurethane, 3rd revised edition, 1993, edited by Prof. Dr. G. W. Becker and Prof. Dr. D. Braun (Carl-Hanser-Verlag, Munich, Vienna).

For the preparation of polyurethane elastomers with high-quality mechanical properties, 1,5-diisocyanatonaphthalene (1,5-NDI) has proven to be an isocyanate unit suitable for such elastomers.

Because 1,5-NDI is not easy to handle due to its relatively high melting point, attempts to replace 1,5-NDI with cheaper diisocyanates that are easier to handle without losing the favorable properties of PU elastomers based on 1,5-NDI continue to be made.

In this connection, German Offenlegungsschriften DE 19 627 907; 19 628 145; and 19 628 146 describe attempts to replace 1,5-NDI with other diisocyanates that are said to be suitable for providing compact or cellular PU elastomers with a comparably favorable profile of mechanical properties.

Both when 1,5-NDI is used as an isocyanate component for PU elastomers and when the diisocyanates proposed in the above-mentioned German Offenlegungsschriften (i.e., 4,4'-stilbene diisocyanate, 3,3'-dimethoxy-4,4'-diisocyanato-diphenyl and 1,4-phenylene-diisocyanate) are used with at least one additional aromatic diisocyanate chosen from the group of toluene-diisocyanate and diphenylmethane-diisocyanate, the color stability of the elastomers can not yet be regarded as satisfactory.

Moreover, an improvement in the storage stability of prepolymers based on the above-mentioned isocyanate components when the polyurethane cast elastomers are prepared by the prepolymer process is also required.

SUMMARY OF THE INVENTION

It is an object of the present invention to provide new polyurethane cast elastomers having increased color stability, combined with high-quality mechanical properties.

It is also an object of the present invention to provide PU cast elastomers with good properties that are inexpensive to prepare.

It is another object of the present invention to provide prepolymers from which polyurethane cast elastomers may be produced that have a high storage stability, which results in a longer, particularly user-friendly processing time.

These and other objects which will be apparent to those skilled in the art are accomplished by using durene diisocyanate to produce the NCO-terminated pre-polymers and/or cast polyurethane elastomer.

DETAILED DESCRIPTION OF THE INVENTION

The present invention is directed to polyurethane elastomers (PU elastomers) prepared from a) at least one higher molecular weight polyhydroxyl compound having an average molecular weight of from about 500 to about 6,000 and a functionality of at least 2,
b) 2,3,5,6-tetramethyl-1,4-diisocyanatobenzene (durene diisocyanate) and
c) at least one low molecular weight chain-lengthening and/or crosslinking agent having at least two hydroxyl groups and an average molecular weight of from about 18 to about 800.

Higher molecular weight hydroxyl compounds preferably used in the process of the present invention include those hydroxyl compounds having an average molecular weight of from about 800 to about 4,000, most preferably from about 1,000 to about 3,500.

Suitable higher molecular weight polyhydroxy compounds include, in principle, any of the polyhydroxyl compounds which are used in polyurethane chemistry. Polyether polyols, polyester polyols and polycarbonates containing hydroxyl groups are preferred.

The polyester, polyether and polycarbonate polyols can be employed either individually or in a mixture with one another. Suitable polyester, polyether and polycarbonate polyols which can be used for producing the PU elastomers according to the invention are listed in detail, for example, in DE 19 627 907, at pages 4 and 5.

Polyester components which are preferably employed are those which are produced from succinic acid or adipic acid and ethylene glycol, diethylene glycol, 1,4-butanediol or 1,6-hexanediol. Those polyesters produced from adipic acid and ethylene glycol are particularly preferred.

Polyoxytetramethylene glycols are the preferred polyether polyols.

The chain-lengthening and crosslinking agents which can be employed in the practice of the present invention include any of the chain-lengthening and crosslinking agents known from polyurethane chemistry. These chain lengthening and crosslinking agents generally have an average molecular weight of from about 18 to about 800, preferably from 18 to 400, most preferably from 60 to 300. These chain lengthening and crosslinking agents may be derived, for example, from alkanediols, dialkylene glycols and polyoxyalkylene glycols (chain-lengthening agents) and 3- or 4-hydric alcohols and oligomeric polyoxyalkylene polyols with a functionality of 3 to 6 (crosslinking agents). In this connection, reference is again made to DE-A-19 627 907, pages 5 and 6 which describes such agents in greater detail. Chain-lengthening and crosslinking agents which are particularly preferably employed include: ethylene glycol, diethylene glycol, 1,4-butanediol, 1,6-hexanediol, hydro-quinone bis (2-hydroxyethyl) ether, 1,1,1-tris(hydroxymethyl)-n-propane and water.

The chain-lengthening and crosslinking agents can, of course, be employed individually or in a mixture with one another. The specific chain-lengthening, crosslinking agents and higher molecular weight polyhydroxyl compounds used are selected on the basis of the desired profile of mechanical properties of the PU elastomers to be prepared.

The PU elastomers of the present invention based on durene diisocyanate can be obtained both as compact elastomers and in cellular form.

To establish the mechanical properties, for example, the hardness, in the PU elastomers, the amounts of the reactants can be varied over a wide range of ratios. The elastomer hardness increases as the content of difunctional chain-lengthening and at least trifunctional crosslinking agents in the PU elastomer is increased. The amounts of the reactants necessary to achieve the desired hardness can be determined experimentally in a simple manner. To prepare compact PU elastomers, it is preferred that the higher molecular weight polyol (component a)) be used in an amount of from about 30 to about 96 wt. % (based on the total weight of the reactive components), more preferably from about 55 to about 90 wt. %; the 2,3,5,6-tetramethyl-1,4-diisocyanatobenzene (component b)) be used in an amount of from about 5 to about 40 wt. % (based on the total weight of the reactive components), preferably from about 10 to 25 wt. %; and the crosslinking and/or chain extending agent (component c)) be used in an amount of from about 0.5 to 30 wt. % (based on the total weight of the reactive components), preferably from about 1 to 20 wt. %.

For the preparation of PU elastomers with a cellular structure, the amount of component a) is generally from about 46 to about 96 wt. % (based on the total weight of the reactive components), preferably from about 65 to about 90 wt. %; the amount of component b) is 5 to 40 wt. % (based on the total weight of the reactive components), preferably from about 10 to about 25 wt. %; and the amount of component c) is from about 0.1 to 20 wt. % (based on the total weight of the reactive components), preferably from about 0.2 to about 10 wt. %.

The conventional additives of polyurethane chemistry can, of course, also be incorporated into the PU elastomers according to the present invention. Examples of such additives include: surface-active substances, fillers, flameproofing agents, nucleating agents, oxidation retardants, stabilizers, lubricants and mold release agents, dyestuffs and pigments, foam stabilizers and cell regulators (in cellular PU elastomers). DE-A-19 627 907 describes these additives in greater detail at pages 8 and 9.

The PU elastomers of the present invention are preferably prepared by the so-called prepolymerization process, using durene diisocyanate in the form of a prepolymer containing isocyanate groups. This prepolymer can be prepared, for example, by reaction of durene diisocyanate with at least one higher molecular weight polyhydroxy compound a) or a mixture of a) and at least one chain-lengthening agent and/or at least one crosslinking agent c) or by stepwise reaction of durene diisocyanate with at least one higher molecular weight polyhydroxy compound a) and then with at least one chain-lengthening and/or crosslinking agent.

To produce the durene diisocyanate prepolymer, the polyol component(s) is reacted with the durene diisocyanate in an amount sufficient to produce an isocyanate-terminated prepolymer having an isocyanate group content of from about 1 to about 19%, preferably from about 2 to about 10%, most preferably from about 2 to about 7%. The prepolymer with isocyanate end groups thus obtained may then be reacted with component c) as described above in amounts such that the NCO index is from about 0.9 to about 1.3, preferably from about 0.95 to about 1.2, most preferably from about 1.0 to about 1.2.

For the preparation of the prepolymer and also for the reaction of the prepolymer with the chain-lengthening agent mentioned and/or the crosslinking agent it is helpful to add catalysts.

Suitable catalysts for the preparation of both the prepolymers and the finished PU elastomers are, in principle, any of the catalysts known in PU chemistry. Examples of useful catalysts are organometallic compounds, preferably organotin compounds, such as tin(II) salts of organic carboxylic acids, e.g. tin(II) acetate, tin(II) octoate, tin(II) ethylhexoate and tin laurate, and the dialkyltin(IV) salts of organic carboxylic acids, e.g. dibutyltin diacetate, dibutyltin dilaurate, dibutyltin maleate and dioctyltin diacetate. The organometallic catalyst compounds are employed by themselves or in combination with strongly basic amines, such as amidines, tertiary amines, tetraalkylenediamines or alkanolamine compounds. DE-A 19 627 907 discloses such catalysts at page 7. Alkali metal and alkaline earth metal salts of organic carboxylic acids are also suitable as catalysts.

Catalysts which are preferably used for the preparation of cellular PU elastomers include sodium salts and potassium salts of carboxylic acids such as sodium acetate, potassium acetate, sodium oleate and potassium oleate.

The amount of catalyst used is generally from about 0.001 to about 3 wt. %, preferably from about 0.001 to about 1 wt. %, based on the total weight of components a)+b).

To prepare a compact, massive PU elastomer, the reaction of components a), b) and c) is carried out in the absence of moisture and blowing agents having a physical or chemical action. If cellular PU elastomers are to be prepared, the reaction of the isocyanate and polyol components is carried out in the presence of a blowing agent. Blowing agents which may be used include: water and low-boiling liquids which evaporate under the influence of the exothermic polyaddition reaction and advantageously have a boiling point under normal pressure in the range of from about −40 to about 120° C., gases which have a physical blowing action and blowing agents which have a chemical action. The low-boiling liquids can, of course, be employed in combination with water as a blowing agent. Liquids and gases of the above-mentioned type which may be used as blowing agents include any of the blowing agents known to be useful for the production of cellular, shaped PU articles. Examples of such blowing agents include: low-boiling alkanes, ethers, alcohols and the known halogenated, preferably fluorinated, alkanes, and gases, such as nitrogen, carbon dioxide and noble gases. Blowing agents which are suitable for the preparation of cellular PU elastomers are listed in detail, for example, in DE-A-19 627 907 at page 8.

Although the preparation of compact or cellular PU elastomers is preferably carried out by the prepolymerization process, it is also possible for the PU elastomers to be prepared by other conventional processes for the production of polyurethanes. For details of the known methods for preparing compact or cellular PU elastomers, see, e.g., DE-A 19 627 907, at pages 9 and 10.

Without a filler, the compact PU elastomers of the present invention will generally have a density of from about 1.0 to about 1.4 g/cm$^3$, preferably from about 1.1 to about 1.3 g/cm$^3$. Filler-containing products will usually have a density of >1.2 g/cm$^3$. The cellular PU elastomers will generally have a density of from about 0.2 to about 1.1 g/cm$^3$, preferably from about 0.35 to about 0.80 g/CM$^3$.

The PU elastomers prepared in accordance with the present invention may be used to produce shaped articles that will be exposed to high mechanical stresses, preferably for machinery construction and transport applications such as rollers, conveyor belts, gearwheels and seals. The cellular PU elastomers of the present invention are particularly suitable for the production of damping and spring elements.

Having thus described the invention, the following examples are given as being illustrative thereof. All parts and percentages given in these examples are parts by weight and percentages by weight, unless otherwise indicated.

EXAMPLES

General Procedure:

A polyester of adipic acid and ethylene glycol (OH number 56 mg KOH/g; acid number 0.8 mg KOH/g) was initially introduced into a glass resin kettle and de-watered at 120° C. and 20 mbar for 30 minutes, durene diisocyanate or (for comparison examples) 1,5-diisocyanatonaphthalene (1,5-NDI) and optionally dibutyltin dilaurate as a catalyst were then added, while stirring. For the reaction, the mixture was heated to 145° C. and stirred under normal pressure for 15 minutes and then under 20 mbar for 15 minutes. The mixture was then cooled to 130° C., 1,4-butanediol was added for chain lengthening, and the mixture was stirred under 20 mbar for 2 minutes. The product was then poured into a test specimen mold preheated to 120° C. and then heat-treated at 120° C. for 4 hours. After removal from the mold, the test specimen was heat-treated at 120° C. for an additional 20 hours and then subjected to measurement.

The properties of the products are summarized in Tables 1 and 2. The properties of the products of the comparative examples are also reported in these Tables.

TABLE 1

| | Example | |
|---|---|---|
| | 1 (Comparison) | 2 |
| Polyester (g) | 166.68 | 166.93 |
| Durene diisocyanate (g) | 0.00 | 30.05 |
| 1,5-Diisocyanatonaphthalene (1,5-NDI) (g) | 30.00 | 0.00 |
| Dibutyltin dilaurate (g) | 0.00 | 0.10 |
| 1,4-Butanediol (g) | 3.32 | 3.02 |
| Hardness (Shore A) | 80 | 73 |
| Glass transition temperature (° C.) | −29 | −30 |
| Tensile strength in accordance with DIN 53 455 (MPa) | 47 | 43 |
| Elongation at break in accordance with DIN 53 455 (%) | 620 | 700 |
| E modulus (20° C.) in accordance with DIN 53 440 (MPa) | 60 | 40 |
| E modulus (150° C.) in accordance with DIN 53 440 (MPa) | 30 | 40 |
| Heat resistance from the E modulus = 1 MPa (° C.) | 210 | 215 |
| Color after storage for 3 months | brown-violet | colorless |

TABLE 2

| | Example | |
|---|---|---|
| | 3 (Comparison) | 4 |
| Polyester (g) | 145.99 | 146.24 |
| Durene diisocyanate (g) | 0.00 | 43.87 |
| 1,5-Diisocyanatonaphthalene (g) | 43.80 | 0.00 |
| Dibutyltin dilaurate (g) | 0.00 | 0.10 |
| 1,4-Butanediol (g) | 10.22 | 9.74 |
| Hardness (Shore A) | 92 | 89 |
| Glass transition temperature (° C.) | −28 | −31 |
| Tensile strength in accordance with DIN 53 455 (MPa) | 50 | 40 |
| Elongation at break in accordance with DIN 53 455 (%) | 540 | 600 |
| E modulus (20° C.) in accordance with DIN 53 440 (MPa) | 130 | 100 |
| E modulus (150° C.) in accordance with DIN 53 440 (MPa) | 120 | 95 |
| Heat resistance from the E modulus = 1 MPa (° C.) | 240 | 230 |
| Color after storage for 3 months | brown-violet | colorless |

Results: The mechanical properties of the elastomers produced in accordance with the present invention correspond to the outstanding properties of the NDI elastomers; however, the products produced in accordance with the invention are stable in color.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molded or cast article capable of withstanding high mechanical stress produced from a cellular polyurethane elastomer having a density within the range of from about 0.2 to about 1.1 g/cm³ which comprises a reaction product of:
   a) from about 85 to about 90 wt. %, based on the total weight of the reaction product, of at least one higher molecular weight polyhydroxyl compound having an average molecular weight of from 500 to 6,000 and a functionality of at least 2;
   b) from about 10 to about 25 wt. %, based on the total weight of the reaction product, of 2,3,5,6-tetramethyl-1,4-diisocyanatobenzene; and
   c) from about 0.2 to about 10 wt. %, based on the total weight of the reaction product, of at least one low molecular weight chain-lengthening and/or crosslinking agent having at least two hydroxyl groups and an average molecular weight of from 60 to 800, with the proviso that the at least one chain-lengthening and/or crosslinking agent may not be water.

2. A process for producing the molded or cast article of claim 1, wherein the higher molecular weight polyhydroxyl compound a) is reacted with the diisocyanate b) to produce an isocyanate-terminated prepolymer which is reacted with the at least one chain-lengthening and/or crosslinking agent and/or the at least one higher molecular weight polyhydroxyl compound.

3. The process of claim 2 in which the chain lengthening and/or crosslinking agent c) is present during production of the prepolymer.

4. The shaped article of claim 1 in which the cellular polyurethane elastomer is prepared in the presence of at least one catalyst selected from the group consisting of sodium salts and potassium salts of carboxylic acids in which the catalyst(s) is/are present in an amount in the range of from about 0.001 to about 3 wt. %, based on the total weight of reaction product.

5. A molded or cast article capable of withstanding high mechanical stress produced from a cellular polyurethane elastomer having a density within the range of from about 0.2 to about 1.1 g/cm³ which comprises the reaction product of:
   a) from about 65 to about 90 wt. %, based on the total weight of reaction product, of at least one higher molecular weight polyhydroxyl compound having an average molecular weight of from 500 to 6,000 and a functionality of at least 2;
   b) from about 10 to about 25 wt. %, based on the total weight of reaction product, of at least one 2,3,5,6-tetramethyl-1,4-diisocyanatobenzene; and
   c) from about 0.2 to about 10 wt. %, based on the total weight of reaction product, of water and/or at least one low molecular weight chain-lengthening and/or crosslinking agent having at least two hydroxyl groups and an average molecular weight of from 60 to 800;

wherein the higher molecular weight polyhydroxyl compound a) is reacted with the diisocyanate b) in the presence of a chain-lengthening and/or crosslinking agent c) to produce an isocyanate-terminated prepolymer.

6. The molded or cast article of claim 5 in which the cellular polyurethane elastomer is prepared in the presence of at least one catalyst selected from the group consisting of sodium salts and potassium salts of carboxylic acids in which the catalyst(s) is/are present in an amount in the range of from about 0.001 to about 3 wt. %, based on the total weight of reaction product.

* * * * *